United States Patent [19]

Faustinos

[11] 4,188,928
[45] Feb. 19, 1980

[54] FUEL VAPORIZING APPARATUS FOR INTERNAL COMBUSTION ENGINES

[76] Inventor: Carlos Q. Faustinos, 539½ Heliotrope St., Los Angeles, Calif. 90004

[21] Appl. No.: 771,394

[22] Filed: Feb. 23, 1977

[51] Int. Cl.² .......................................... F02M 31/00
[52] U.S. Cl. ........................ 123/122 AA; 123/25 K; 123/122 D; 261/144; 261/145
[58] Field of Search ......... 123/122 AA, 122 D, 25 K, 123/25 B, 25 D, 25 N, 25 H; 261/144, 145

[56] References Cited

U.S. PATENT DOCUMENTS

| | | | |
|---|---|---|---|
| 1,318,915 | 10/1919 | Pizrchalski | 123/25.11 |
| 1,509,017 | 9/1924 | Miller | 123/25 K |
| 1,518,698 | 12/1924 | Nilson | 123/25 K |
| 1,630,048 | 5/1927 | Balachowsky | 123/122 AA |
| 1,766,363 | 6/1930 | Smith | 123/25 B |
| 2,100,511 | 11/1937 | Kelty | 123/25 K |
| 3,850,152 | 11/1974 | Hollins | 123/122 D |
| 3,911,871 | 10/1975 | Williams | 123/25 K |
| 3,968,775 | 7/1976 | Harpman | 123/25 B |
| 3,996,902 | 12/1976 | Ri | 123/25 B |
| 4,016,847 | 4/1977 | Rychlik | 123/122 AA |

Primary Examiner—Ronald H. Lazarus

[57] ABSTRACT

Fuel vaporizing apparatus wherein air admitted to the carburetor is pre-heated and mixed with vaporized water and then caused to vaporize and mix with fuel. The exhaust gases are passed through a heat exchanger located between the carburetor and the intake of the engine to further and more completely vaporize and mix the mixture of fuel, water and air to prevent condensation. The supply of water is controlled by the temperature and speed of the engine.

2 Claims, 6 Drawing Figures

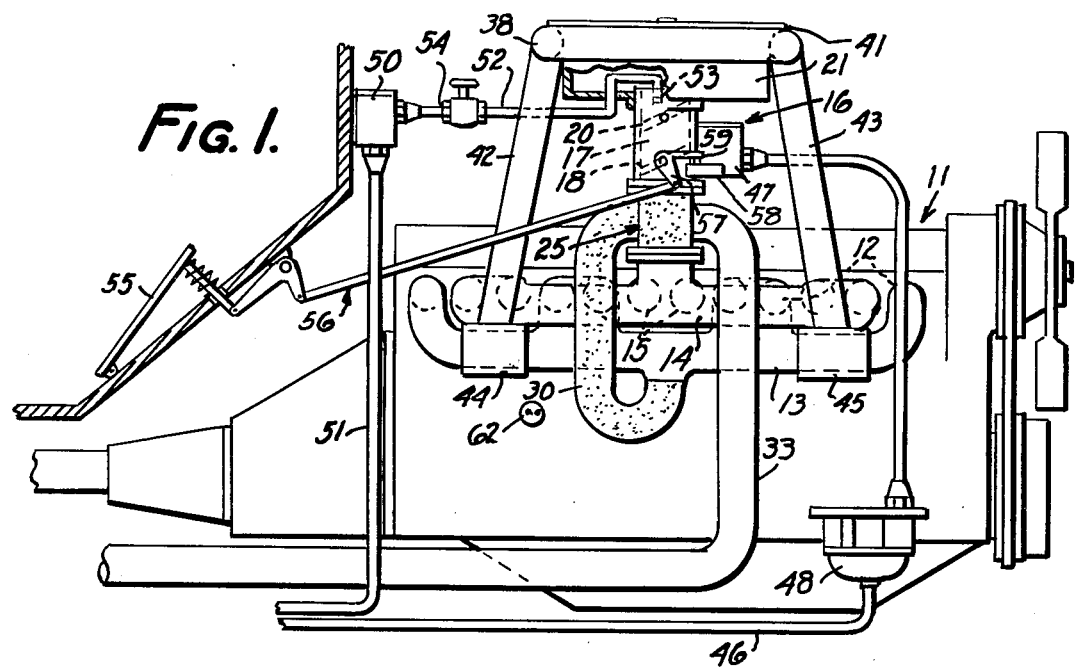

FUEL VAPORIZING APPARATUS FOR INTERNAL COMBUSTION ENGINES

BACKGROUND OF THE INVENTION

1. Field of the Invention

This invention relates to apparatus for more completely vaporizing the explosive fuel mixture for an internal combustion engine and has particular reference to apparatus for vaporizing and mixing water and gasoline or other explosive fuel with air and for preventing condensation prior to being admitted into the combustion chambers of the engine.

2. Description of the Prior Art

It has long been known that the application of small amounts of water vapor to the fuel-air mixture applied to the intake of an internal combustion engine will improve the performance of the engine, and cause a measurable increase in power and fuel savings. Heretofore, this has generally been accomplished by injecting a small spray of water or steam into the carburetor, from whence it is fed, along with a vaporized gasoline or other gaseous fuel into the combustion chambers of the engine. The U.S. patents to Hyvert No. 1,460,964, Fletcher No. 1,572,276 and Berger No. 3,177,851 are examples of such water vapor admitting devices.

Although such foregoing water vapor admitting devices are satisfactory to some extent, they are severely restricted in the amount of water vapor that they can inject into the engine and therefore any improvement resulting from admission of water vapor is likewise limited. This is mainly because the temperature of the air-fuel-water mixture passing through the carburetor is relatively low, due, for example, to the expansion of the gasoline during vaporization, thus resulting in a tendency for the mixture, particularly the water, to condense before or after it is admitted into the combustion chambers. If such condensation or improper vaporization of the mixture occurs, the engine performance is decreased rather than increased.

SUMMARY OF THE INVENTION

Therefore, it becomes the principal object of the present invention to improve the performance of an internal combustion engine.

Another object is to reduce the fuel consumption of an internal combustion engine.

Another object is to enable a greater amount of water vapor to be mixed with a gaseous fuel for an internal combustion engine than was possible heretofore.

Another object is to reduce pollution of the atmosphere by the products of combustion in an internal combustion engine.

Another object is to prevent build-up of carbon deposits in the combustion chambers of an internal combustion engine.

According to the present invention, water is sprayed into a stream of heated air which is heated by the engine exhaust and is admitted to the intake of the carburetor of the engine. Such mixture is used to atomize the gasoline. The resulting gaseous mixture is further heated by the engine exhaust and mixed to completely vaporize the same and to maintain the same heated and in completely vaporized condition until it is injected into the combustion cylinders. Means are provided to restrict injection of the water during engine idling conditions and when the engine is first started or is otherwise below a predetermined operating temperature.

BRIEF DESCRIPTION OF THE INVENTION

The manner in which the above and other objects of the invention are accomplished will be readily understood upon reference to the following specification when read in conjunction with the accompanying drawing, wherein:

FIG. 1 is a side view of an internal combustion engine embodying a preferred form of the present invention.

FIG. 2 is an enlarged sectional elevation view through the main heat exchanger.

FIG. 3 is a sectional plan view through the main heat exchanger and is taken along line 3—3 of FIG. 2.

FIG. 4 is a sectional view, with parts broken away, of the pre-heating device or secondary heat exchanger for heating air admitted to the carburetor.

FIG. 5 is a schematic wiring diagram of the circuit for energizing the water pump.

FIG. 6 is a sectional view through a valve for controlling the flow of water in accordance with the speed of the engine as incorporated in a modified form of the invention.

DESCRIPTION OF THE PREFERRED EMBODIMENT

Referring to the drawing, the invention is illustrated as embodied in a conventional gasoline engine generally indicated at 11 which may be incorporated in a vehicle or used as a stationary power plant. I hereinafter intend that the term "gasoline" is to define gasoline or any other explosive liquid fuel which is mixed with air to form an explosive mixture admitted to the engine cylinders to drive the engine.

The exhaust gases resulting from combustion of the fuel mixture are exhausted through exhaust ports, i.e., 12 of the engine cylinders into an exhaust manifold 13. The explosive vaporized fuel mixture, on the other hand, is admitted to the engine through an intake manifold 14 which opens into intake ports, i.e., 15 of the engine cylinders.

The engine 11 includes a conventional down draft carburetor generally indicated at 16 having a throat 17 in which are located a butterfly type throttle valve 18 and a choke valve 20 which is preferably automatically contolled in a conventional manner. An air filter 21 having suitable air filtering material (not shown) therein is mounted on top of the carburetor 16 to admit filtered air into the throat 17. The carburetor 16 is provided with a mounting flange 22 (FIG. 2) attached by bolts 23 to a corresponding flange 24 formed on a primary heat exchanger generally indicated at 25. The latter has a lower mounting flange 26 attached by bolts 27 to a flange 28 forming part of the intake manifold 14.

The exhaust manifold 13 communicates with the inlet 31 of the heat exchanger 25 through a conduit 30 and the outlet 32 of the heat exchanger opens into an exhaust tube 33 which is connected to a conventional muffler (not shown) from which the exhaust gases are exhausted into the atmosphere.

The heat exchanger 25 comprises a thin walled cylindrical shell 34 of copper or other metal having a relatively high coefficient of heat conductivity, which shell is integrally attached at its upper and lower ends to the flanges 24 and 26, respectively. The shell 34 is preferably of the same intake diameter as the inside diameters of the adjacent portion of the throat 17 of the carburetor 16 and the intake manifold 14 to permit substantially uninterrupted flow of gases from the carburetor to the intake manifold. An outer wall 34 surrounds the shell 34 and it is also integrally connected to the flanges 24 and 26 to form an enclosing space 36 surrounding the shell 34 and communicating the inlet 31 and outlet 32. A series of thin walled open ended tubes 37 of copper or the like are integrally mounted at their ends on the shell 34 to extend thereacross so as to convey a large portion of the exhaust gases between the inlet 31 and outlet 32. Such tubes are aligned with the flow of exhaust gases and are spaced from each other both vertically and horizontally to provide a relatively large area of contact with the fuel, water and air mixture as it passes downwardly from the carburetor to both heat the mixture to a relatively high temperature to insure complete vaporization and to create a turbulence which effects thorough mixture. The outer surfaces of the heat exchanger 25 and conduit 30 are covered with a layer 39 of asbestos or other heat insulation to prevent loss of heat through these elements.

Means are provided to preheat the air admitted into the intake of the carburetor throat 17. For this purpose, an annular conduit 38 (see also FIG. 4) is suitably mounted in a position surrounding the upper lip of the air filter 21. A plurality of openings 40 are formed in the conduit 38, opening into the air filter. A cover 41 is suitably secured over the conduit 38 to seal the upper end of the filter 21. Conduits 42 and 43 open at their upper ends into the annular conduit 38 and open at their lower ends into heat trasfer sleeves 44 and 45 which surround but are spaced from the exhaust manifold 13 to form secondary heat exchangers.

Accordingly, during operation of the engine, air being drawn through the carburetor is heated as it passes between the exhaust manifold 13 and the sleeves 44 and 45 and is conveyed through the conduits 42 and 43, and conduit 38, into the carburetor throat 17. Gasoline is supplied to the carburetor 16 in the usual manner from a storage tank (not shown) through a line 46. An engine driven fuel pump 48 yieldably forces the gasoline through the line 46 into a float controlled chamber 47 from whence it is led to an atomizing jet (not shown) in the carburetor where it is atomized and mixed with the heated air stream passing through the carburetor throat 17.

Means are provided to normally spray a supply of water into the carburetor throat 17 above the choke valve 20. For this purpose, an electrically operated pump 50 is provided having its inlet connected through a line 51 to a suitable storage tank (not shown) and its outlet connected through an outlet line 52 which extends through the air filter 21 and terminates a jet orifice 53 located in the upper end of the carburetor throat 17.

A manually adjustable valve 54 is connected in the outlet line 52 to control the amount of water admitted into the carburetor.

The carburetor throttle valve 18 is controlled by a foot pedal 55 through a linkage 56 which includes a lever 57 attached to the shaft of the valve 18. The lever 57 is effective, when in its extreme clockwise illustrated position, to cause the engine to idle. In this condition, an arm 59 on lever 57 causes a switch 58 to open. Switch 58 (see also FIG. 5) is connected in a power circuit 60 for an electromechanical actuator 61 of pump 50. Also connected in series with the switch 58 is a switch 161 controlled by a thermostat 62 which senses the temperature of the engine 11.

In operation, it has been found that the valve 54 can be adjusted to admit an amount of water substantially equal to the amount of gasoline used at normal speeds. The preheated air passing into the carburetor throat 17 tends to further vaporize the water spray emitted from the orifice 53 and carries it past the point of gasoline injection where the gasoline is atomized and mixed with the water and air mixture. As this gaseous mixture passes through the heat exchanger 25, it is further heated to insure complete vaporization, and the turbulence caused in passing the various heater tubes 37 insures complete mixture. The intake manifold 14 may, if desired, be surrounded with a layer of asbestos, similar to layer 49, to prevent loss of heat through the manifold.

Initially, when the engine is first started, both switches 58 and 161 are open and no water is fed into the carburetor. However, when the engine temperature rises to a normal level and the pedal 55 is depressed to increase the engine speed substantially above idling the circuit 60 is completed to cause operation of the pump 50.

FIG. 6 illustrates a modified form of the invention in which a valve 63 is connected in the line 52 leading from the water pump 50 to control the amount of water admitted to the carburetor in proportion to the speed of the engine. The valve 63 comprises a casing 64 having diametrically opposed internal ports 65 and 66. A valve member 67 is rotatably mounted in the casing and has a transverse opening 68 therein adapted to communicate the ports 65 and 66. The valve member 67 is connected to a lever 69 which is suitably connected by a link 70 to the throttle operating linkage 56. As the latter is advanced to increase the engine speed, the valve member 67 is rocked counterclockwise to allow a greater amount of water to flow through the line 52 and into the carburetor.

It has been discovered that the relatively large volume of water consumed by the engine greatly reduces the amount of pollutants expelled into the atmosphere and also greatly reduces the amount of carbon deposition within the engine cylinders. Also, in an engine modified in accordance with the present invention the amount of gasoline consumption was reduced by approximately 50% and liquid fuels of less volatility than gasoline can be utilized.

It will be obvious to those skilled in the art that many variations may be made in the exact construction shown without departing from the spirit and the scope of this invention, as defined by the appended claims. For example, although the invention is disclosed in connection with a 6 cylinder in line engine, it is equally well applicable to a V-type engine of any number of cylinders.

I claim:

1. A gaseous fuel generating apparatus for an internal combustion engine having an intake passage for a gaseous fuel,
   a carburetor having an inlet,
   said carburetor being connected to said intake passage for vaporizing a liquid fuel and mixing said fuel with air passing through said air inlet and said carburetor, and
   means forming an exhaust passage for conveying exhaust gases from said engine to the atmosphere,
   which comprises;
   means forming a water vaporizing device adjacent said inlet;

means for admitting water to said vaporizing device whereby to mix said vaporized water with said air passing into said air inlet,
a heat exchanger heated by said exhaust gases for heating air,
means for conveying said heated air to said inlet whereby to heat said vaporized water, and
a second heat exchanger in said exhaust passage,
said second heat exchanger extending between said carburetor and said intake passage to further heat said air and vaporized water and fuel mixture,
Said carburetor further including a throttle valve, means for adjusting said valve to control the amount of said mixture passing through said carburetor,
means for sensing the temperature of said engine, and
control means controlled jointly by said adjusting means and by said temperature sensing means for controlling said means for admitting water.

2. A gaseous fuel generating apparatus for an internal combustion engine having an intake passage for a gaseous fuel,
a carburetor having an inlet,
said carburetor being connected to said intake passage for vaporizing a liquid fuel and mixing said fuel with air passing through said air inlet and said carburetor, and
means forming an exhaust passage for conveying exhaust gases from said engine to the atmosphere, which comprises;
means forming a water vaporizing device adjacent said inlet,
means for admitting water to said vaporizing device whereby to mix said vaporized water with said air passing into said air inlet,
a heat exchanger heated by said exhaust gases for heating air,
means for conveying said heated air to said inlet whereby to heat said vaporized water, and
a second heat exchanger in said exhaust passage,
said second heat exchanger extending between said carburetor and said inlet passage to further heat said air and vaporized water and fuel mixture,
an electrically operable pump for pumping water to said means for admitting water;
control means for controlling the flow of said mixture through said carburetor,
a first electric switch,
means responsive to said control means upon causing a predetermined amount of flow of said mixture through said carburetor for closing said first switch,
a second electric switch,
means responsive to the temperature of said engine for closing said second switch when said temperature increases above a predetermined amount, and
an electric circuit for energizing said pump,
said circuit comprising said first and second switches connected in series.

* * * * *

UNITED STATES PATENT AND TRADEMARK OFFICE
CERTIFICATE OF CORRECTION

PATENT NO. : 4,188,928
DATED : February 19, 1980
INVENTOR(S) : Carlos Q. Faustinos It is certified that error appears in the above—identified patent and that said Letters Patent are hereby corrected as shown below:

In the heading, below "Inventor", should appear at box 73, Assignee: "Carvero Inc., Los Angeles, California".

Signed and Sealed this

Twentieth Day of May 1980

[SEAL]

Attest:

SIDNEY A. DIAMOND

Attesting Officer

Commissioner of Patents and Trademarks